US005507952A

United States Patent [19]

Jaquess et al.

[11] Patent Number: 5,507,952

[45] Date of Patent: Apr. 16, 1996

[54] ENZYMES FOR RECREATIONAL WATER

[75] Inventors: Percy Jaquess, Tigrett; Fernando Del Corral, Memphis, both of Tenn.

[73] Assignee: Buckman Laboratories International, Inc., Memphis, Tenn.

[21] Appl. No.: 502,297

[22] Filed: Jul. 13, 1995

Related U.S. Application Data

[62] Division of Ser. No. 184,108, Jan. 21, 1994, Pat. No. 5,474,701.

[51] Int. Cl.$^{6}$ .......... C02F 1/66

[52] U.S. Cl. .......... 210/632; 435/262

[58] Field of Search .......... 210/632; 435/262

[56] References Cited

U.S. PATENT DOCUMENTS

| | | |
|---|---|---|
| 4,169,817 | 10/1979 | Weber . |
| 4,243,543 | 1/1981 | Guilbert et al. . |
| 4,305,837 | 12/1981 | Kaminsky et al. . |
| 4,318,818 | 3/1982 | Letton et al. . |
| 4,404,115 | 9/1983 | Tai . |
| 4,462,922 | 7/1984 | Boskamp . |
| 4,548,727 | 10/1985 | Shaer . |
| 4,801,544 | 1/1989 | Munk . |

FOREIGN PATENT DOCUMENTS

| | | |
|---|---|---|
| 0352244A2 | 1/1990 | European Pat. Off. . |
| 0352244A3 | 1/1990 | European Pat. Off. . |
| 0376705A1 | 7/1990 | European Pat. Off. . |

OTHER PUBLICATIONS

English Language Abstract of JP 68011290.
English Language Abstract of JP 62175419.
Communication from the International Searching Authority of the International Bureau of WIPO dated Jun. 12, 1995 in PCT/US/95/00685 and International Search Report.

*Primary Examiner*—Neil McCarthy
*Attorney, Agent, or Firm*—Finnegan, Henderson, Farabow, Garrett and Dunner

[57] ABSTRACT

An enzyme composition of matter is disclosed for reducing the amount of acylglycerol esters in water comprising a lipase enzyme, a non-ionic emulsifying agent, a water soluble organic acid preservative and a water soluble stabilizer. The lipase enzyme can be used in conjunction with other enzymes. The non-ionic emulsifying agent can comprise an alcohol ethoxylate, the water soluble organic acid preservative can comprise sorbic acid and the water soluble stabilizer can comprise glycerol. A method for treating water containing acylglycerol esters with the foregoing compositions is also disclosed.

12 Claims, No Drawings

ENZYMES FOR RECREATIONAL WATER

This is a division of application Ser. No. 08/184,108, filed Jan. 21, 1994, now U.S. Pat. No. 5,474,701, issued Dec. 12, 1995.

FIELD OF THE INVENTION

The field of the invention is a composition and method for reducing the amount of acylglycerol esters in water.

DESCRIPTION OF RELATED ART

Japanese Patent No. 68011290 describes an additive for bath water, the additive including lipase, some amylase and other ingredients.

Japanese Patent No. 62175419 describes a bathing agent which gives a spa effect and includes a protease enzyme, lecithin, and an ore powder block which elutes various metals. Plant materials along with artificial or natural fragrances and inorganic salts are also incorporated in the bathing agent.

The stabilization of an aqueous enzyme preparation using certain esters has been describes by Shaer in U.S. Pat. No. 4,548,727. The ester used as a stabilizer has the formula RCOOR', where R is an alkyl of from one to three carbons or hydrogen, and R' is an alkyl of from one to six carbons. The ester is present in the aqueous enzyme preparation in an amount is from 0.1 to about 2.5% by weight. The enzyme ingredient that is employed according to the patentee is a commercial enzyme preparation sold in a dry powder, solution of slurry form containing from about 2 percent to about 80 percent of active enzymes and a carrier such as sodium or calcium sulfate, sodium chloride, non-ionic surfactants or mixtures thereof as the remaining 20 percent to 98 percent.

Guilbert et al., U.S. Pat. No. 4,243,543 teaches the stabilization of liquid proteolytic enzyme-containing detergent compositions. The detergent compositions are stabilized by adding an antioxidant and a hydrophilic polyol to the composition while stabilizing the pH of the composition.

Weber, U.S. Pat. No. 4,169,817 teaches a liquid cleaning composition containing stabilized enzymes. The composition is an aqueous solution containing from 10% to 50% by weight of solids and including detergent builders, surface active agents, an enzyme system derived from *Bacillus subtilus* and an enzyme stabilizing agent. The stabilizing agents comprise highly water soluble sodium or potassium salts and/or water soluble hydroxy alcohols and enable the solution to be stored for extended periods without deactivation of the enzymes.

Dorrit et al., European Patent No. 0 352 244 A2 describes stabilized liquid detergent compositions using an amphoteric surfactant.

Kaminsky et al., U.S. Pat. No. 4,305,837 describes stabilized aqueous enzyme compositions containing a stabilizing system of calcium ions and a low molecular weight carboxylic acid or salt and a low molecular weight alcohol. This stabilized enzyme is used in a detergent composition. The composition may include non-ionic surfactants having the formula $RA(CH_2CH_2O)_nH$ where R is a hydrophobic moiety, A is based on a group carrying a reactive hydrogen atom and n represents the average number of ethylene oxide moieties. R typically contains from about 8 to about 22 carbon atoms but can be formed by the condensation of propylene oxide with a lower molecular weight compound whereas n usually varies from about 2 to about 24. The low molecular weighs alcohol employed may be either a monohydric alcohol containing from 1 to 3 carbon atoms or a polyol containing from 2 to about carbon atoms and from 2 to about 6 hydroxy groups. Kaminsky et al. note that the polyols can provide improved enzyme stability and include propylene glycol, ethylene glycol and glycerine.

Tai, U.S. Pat. No. 4,404,115 describes an aqueous enzymatic liquid cleaning composition which contains as an enzyme stabilizer, an alkali metal pentaborate, optionally with an alkali metal sulfite and/or a polyol.

Boskamp, U.S. Pat. No. 4,462,922 also describes an aqueous enzymatic detergent composition with a stabilizer based on a mixture of boric acid or a salt of boric acid with a polyol or polyfunctional amino compound together with a reducing alkali metal salt. Substantially the same polyols are used as in Kaminsky et al.

Several stable enzymatic formulations for the recreational water market such as spas and pools have been developed, one shared characteristic of these formulations being their active ingredient, triacylglycerol ester hydrolase, more commonly known as lipase. The lipases are ubiquitous in nature and occur widely in animals, plants and microorganisms. Lipases can be isolated on a large scale from only selected sources for commercial uses such as porcine pancreas and certain microorganisms. In order to function effectively, these formulations are desirably non-toxic, biodegradable and effective in removing oil depositions commonly found in pool and/or spa environments.

Since major differences exist in the types of lipases relative to their specificities in the hydrolysis of particular ester bonds of acylglycerol esters, pH optimums, temperature optimums as well as their capacity to be effective on various acylglycerol ester substrates and especially triacylglycerol substrates, it is important to formulate the lipases not only with the proper stabilizers to maintain good activity yields during long storage and use of the products but also the proper preservatives and emulsifying agents.

Due to the intrinsic nature of lipases to hydrolyze ester bonds only at the interphase between lipid and water, lipid emulsifiers have to be selected to increase the surface area of the acylglycerol ester substrate, and thereby increase the rate of hydrolysis. Stated otherwise, the reaction rate of the lipase for hydrolyzing the ester bonds depends on the degree of emulsification of the substrate.

Accordingly, it would be desirable to obtain an enzyme formulation for the reduction or substantial elimination or elimination of acylglycerol esters from water and especially recreational water such as spa or pool water with a formulation that provided optimal reaction rates and optionally, stability, i.e., formulations which contain the proper selection and balance of emulsifying agents, stabilizers and optionally, preservatives.

SUMMARY OF THE INVENTION

The present invention is directed to a novel composition of matter and method that substantially obviates one or more of the foregoing and other problems due to limitations and disadvantages of the related art. More specifically, the present invention is directed to a composition suitable for reducing and in many cases substantially eliminating or eliminating acylglycerol esters from water and especially recreational water such as spa water or pool water. These enzyme compositions of matter are formulated to react at high rates and also to treat a variety of acylglycerol ester substrates. A method for the treatment of water to reduce or substantially eliminate or eliminate acylglycerol ester materials from water using these formulations is also a part of the invention.

Additional features and advantages of the invention will be set forth in the description which follows, and in part will be apparent from the description, or may be learned by practice of the invention. The advantages of the invention will be realized and obtained by the composition of matter and method, particularly, pointed out in the written description and the claims hereof.

To achieve these and other advantages and in accordance with the purpose of the invention, as embodied and broadly described, a novel composition of matter for minimizing or substantially eliminating acylglycerol esters from water and the method for employing these novel compositions has been developed.

The novel composition of matter for reducing or substantially eliminating or eliminating acylglycerol esters in water comprises:

(a) a lipase enzyme;

(b) a non-ionic emulsifying agent;

(c) a water soluble organic acid preservative and (d) a water soluble stabilizer.

It has been found that the composition of matter is especially effective when formulated to have a pH in the range from about 3.5 to about 6.8 and to employ compounds that are substantially biodegradable and substantially non-toxic.

DETAILED DESCRIPTION OF THE INVENTION

Thus, the invention comprises both a novel composition of matter for reducing or substantially eliminating or eliminating acylglycerol esters in water as well as a method for carrying out such process where the composition comprises a lipase enzyme, a non-ionic emulsifying agent, a water soluble organic acid preservative and a water soluble stabilizer.

The lipase enzyme may be employed by itself or in combination with other enzymes so that the lipase will comprise anywhere from about 100 wt % or less of the enzyme used in the composition where the lipase is present in an amount that is effective to substantially hydrolyze lipid materials that are being treated.

By way of example, phospholipases may also be used. Lipases and phospholipases are esterase enzymes which hydrolyze fats and oils by attacking the ester bonds in these compounds. Lipases act on triglycerides, while phospholipases act on phospholipids. In the industrial sector, lipases and phospholipases represent the commercially available esterases. Novo Nordisk markets two Liquid lipase preparations under the names Resinase™A and Resinase™M, A 2X.

Commercial liquid enzymatic compositions containing lipases are available. For example, such compositions are available under the trade names Lipolase 100, Greasex 50L, Palatase™A, Palatase™M, and Lipozyme™ which are all supplied by Novo Nordisk.

Pancreatic phospholipase $A_2$ can be used and is available in a liquid enzymatic composition sold as LECITASE™ by Novo Nordisk. Other enzymes that may be used with any of the lipases are as follows.

Proteases are a well-known class of enzymes frequently utilized in a wide variety of industrial applications where they act to hydrolyze peptide bonds in proteins and proteinaceous substrates. Proteases are used to help to remove protein based stains such as blood or egg stains. Liquid enzymatic compositions containing alkaline proteases have also shown to be useful as dispersants of bacterial films and algal and fungal mats in cooling tower waters and metal-working fluid containment bays.

Proteases can be characterized as acid, neutral, or alkaline proteases depending upon the pH range in which they are active. The acid proteases include the microbial rennets, rennin (chymosin), pepsin, and fungal acid proteases. The neutral proteases include trypsin, papain, bromelain/ficin, and bacterial neutral protease. The alkaline proteases include subtilisin and related proteases. Commercial liquid enzymatic compositions containing proteases are available under the names Rennilase®, "PTN" (Pancreatic Trypsin NOVO), "PEM" (Proteolytic Enzyme Mixture), Neutrase®, Alcalase®, Esperase®, and Savinase™ which are all supplied by Novo Nordisk Bioindustrials, Inc. of Danbury, Conn. Another commercial protease is available under the name HT-Proteolytic supplied by Solvay Enzyme Products.

Amylases, another class of enzymes, have also been utilized in many industrial and commercial processes in which they act to catalyze or accelerate the hydrolysis of starch. As a class amylases include α-amylase, β-amylase, amyloglucosidase (glucoamylase), fungal amylase, and pullulanase. Commercial liquid enzymatic compositions containing amylases are available under the names BAN, Termamyl®, AMG, Fungamyl®, and Promozyme™, which are supplied by Novo Nordisk, and Diazyme L-200, a product of Solvay Enzyme Products.

Other commercially valuable enzyme classes are those which affect the hydrolysis of fiber. These classes include cellulases, hemicellulases, pectinases, and β-glucanases. Cellulases are enzymes that degrade cellulose, a linear glucose polymer occurring in the cell walls of plants. Hemicellulases are involved in the hydrolysis of hemicellulose which, like cellulose, is a polysaccharide found in plants. The pectinases are enzymes involved in the degradation of pectin, a carbohydrate whose main component is a sugar acid. β-glucanases are enzymes involved in the hydrolysis of β-glucans which are also similar to cellulose in that they are linear polymers of glucose. Collectively, cellulases include endocellulase, exocellulase, exocello-biohydrolase, and cellobiase and for the purpose of the present invention will also include hemicellulase. Commercial liquid enzymatic compositions containing cellulases are available under the names Celluclast® and Novozyme®188 which are both supplied by Novo Nordisk.

Hemicellulases that may be used include the xylanases. PULPZYM® product, available from Novo Nordisk, and ECOPULP® product, from Alko Biotechnology, are two examples of commercially available liquid enzymatic compositions containing xylanase-based enzymes.

As a class, hemicellulases include hemicellulase mixture and galactomannanase. Commercial liquid enzymatic compositions containing hemicellulases are available as PULPZYM® from Novo, ECOPULP® from Alko Biotechnology and Novozym®280 and Gamanase™, which are both products of Novo Nordisk.

The pectinases that may be used comprise endopolygalacturonase, exopoly-galacturonase, endopectate lyase (transeliminase), exopectate lyase (transeliminase), and endopectin lyase (transeliminase). Commercial liquid enzymatic compositions containing pectinases are available under the names Pectinex™ Ultra SP and Pectinex™, both supplied by Novo Nordisk.

The β-glucanases that may be used comprise lichenous, laminarinase, and exoglucanase. Commercial liquid enzymatic compositions containing β-glucanases are available under the names Novozym®234, Cereflo®, BAN, Finizym®, and Ceremix®, all of which are supplied by Novo Nordisk.

Another commercially valuable class of enzymes are the isomerases which catalyze conversion reactions between isomers of organic compounds. Sweetzyme™ product is a liquid enzymatic composition containing glucose isomerase which is supplied by Novo Nordisk.

Redox enzymes are enzymes that act as catalysts in chemical oxidation/reduction reactions and, consequently, are involved in the breakdown and synthesis of many biochemicals. Currently, many redox enzymes have not gained a prominent place in industry since most redox enzymes require the presence of a cofactor. However, where cofactors are an integral part of an enzyme or do not have to be supplied, redox enzymes are commercially useful.

The redox enzymes, glucose oxidase, and lipoxidase (lipoxygenase) can be used. Other redox enzymes have possible applications ranging from the enzymatic synthesis of steroid derivatives to use in diagnostic tests. Other redox enzymes include peroxidase, superoxide dismutase, alcohol oxidase, polyphenol oxidase, xanthine oxidase, sulfhydryl oxidase, hydroxylases, cholesterol oxidase, laccase, alcohol dehydrogenase, and steroid dehydrogenases.

The non-ionic emulsifying agent that are preferably used comprise those alkyleneoxide condensation products that favor coupling oil to water and generally have the formula:

$$RX(CH_2CH_2O)_nH$$

where the molecular weight of the emulsifying agent is in a range so that the emulsifying agent is soluble in water at temperatures i from at least about 10° C. and higher or from about 10° C. to about 40° C. or higher. Emulsifying agents that are also substantially non-toxic and substantially biodegradable are preferred.

In the above formula R is a linear alcoholate of sufficient molecular weight so that it is oleophillic and in some instances can contain some alkyl branching. Alcoholares that contain minimal or substantially no alkyl branching are preferred since they are more biodegradable than alcoholares with alkyl branching. The radical R may also be based on an alkyl phenol such as a nonyl phenol or a polyether such as a polyoxypropylene group or a block or heteric mixture of polyoxypropylene and polyoxyethylene groups. In the above formula X may be either oxygen, nitrogen or sulfur or another functionality capable of linking the polyoxyethylene chain to the oleophillic group R. Starting materials that may be employed in this latter regard include secondary amines, N-substituted amides and mercaptans. In most cases, n, the average number of oxyethylene units in the hydrophilic group must be greater than about 5 or about 6 to impart sufficient water solubility to make the materials useful. In any event, the hydrophilic group, $(—(CH_2CH_2O)_n—)$ will comprise greater than 50 mol percent of the emulsifying agent and especially from about 50 mol percent to about 80 mol percent. The hydrophilic group may optionally comprise a hereric or block mixture of repeating oxyethylene groups and oxypropylene groups.

A suitable emulsifying agent that may be used according to the present invention comprises a hydrophobe based on a hydrocarbon moiety of an aliphatic monohydric alcohol which is linear or substantially linear and contains from about 9 to about 15 carbon atoms, where the hydrocarbon moiety has attached thereto, through an ether oxygen linkage, an oxyethylene chain or a heteric or block mixed chain of oxyethylene and 1,2-oxypropylene groups.

The monohydric alcohol generally comprises a mixture of alcohols (preferably those with substantially a bell curve statistical distribution) having from about 9 to about 11 carbon atoms, from about 12 to about 15 carbon atoms, from about 12 to about 13 carbon atoms and from about 11 to about 15 carbon atoms. Those surfactants having a hydrophilic group based on oxyethylene groups are especially preferred. Since the emulsifying agents that are preferred according to the present invention are those that promote oil in water emulsion systems, those emulsifying agents that have a high HLB number (hydrophile-lipophile balance) i.e., from about 8 to about 18 are preferred. Also, these emulsifying agents should have a molecular weight, based on OH number, of from about 270 to about 790 and especially from about 425 to about 610, and a hydroxyl number (mg KOH/g) of from about 71 to about 208, especially from about 92 to about 132. The various emulsifying agents that may be employed in this respect comprise the NEODOL® series from Shell chemical including NEODOL 91, ethoxylate series based on a blend of linear alcohols with from about 9 to about 11 carbon atoms, the NEODOL 25 ethoxylate series based on a blend of linear alcohols containing from about 12 to about 15 carbon atoms, the NEODOL 23 ethoxylate series based on a blend of linear alcohols containing from about 12 to about 13 carbon atoms and the NEODOL 45 ethoxylate series containing from about 11 to about 15 carbon atoms. Comparable emulsifying agents can also be employed sold under the trade names of ALFONIC® (Conoco), POLYTERGENT® (Olin), BRU® (ICI AMERICAS), PLURAFAC® (BASF Wyandotte), SURFONIC® (Texaco), and TERGITOL® (Union Carbide). NEODOL 25 type emulsifying agents are especially preferred.

In one embodiment, the alcohol ethoxylate emulsifying agent is a condensation product of a substantially linear alcohol having from about 9 to about 15 carbons and ethylene oxide so that said ethylene oxide is present as a polyoxyethylene group in an amount greater than about 50 mol % of said alcohol ethoxylate, said alcohol ethoxylate having an HLB of from about 8 to about 18.

Although in some instances the emulsifying agent will act to stabilize the lipase and other enzymes by preferentially taking up water that may be in the composition that could cause the enzyme to hydrolyze, it is preferred that the composition also contains a water soluble stabilizer such as a polyol or a mixture of polyols where the polyol has from 2 to about 6 carbon atoms and from 2 to about 6 hydroxyl groups and includes materials such as 1,2-propanediol, ethylene glycol, erythritan, pentaerythritol, glycerol, sorbitol, mannitol, glucose, fructose, lactose and the like. Preferred stabilizers are those that are substantially non-toxic and substantially biodegradable.

The optional water soluble organic acid preservative that may preferably be employed comprises an unsaturated or saturated organic acid having from 2 to about 10 carbon atoms and from 1 to about 2 carboxyl groups. These preservatives are employed to substantially minimize or substantially prevent spoilage of the composition by yeast, fungi, or other microorganisms. One of the preferred unsaturated organic acids that may be used in this regard comprises 2,4-hexadienoic acid. Other unsaturated acids that may be employed comprise the butenic acids (crotonic, isocrotonic, vinyl acetic and methacrylic acid); pentenic acids (tiglic, angelic and senecioic acid) hexenic acids and teracrylic acid. The water soluble acids which are also substantially non-toxic and substantially biodegradable are preferred.

Other unsaturated acids that may be employed in this regard include maleic acid (cis-butenedioic acid) and fumaric acid (trans-butenedioic acid) as well as citraconic acid (methyl-maleic acid).

Other acids that can be employed comprise oxalic, malonic, succinic, glutaric, adipic, pimelic, suberic, azelaic and sebaic acid. The various derivatives of malonic acid that are also suitable include allyl malonic acid, butyl malonic acid, dimethyl malonic acid, ethyl malonic acid, ethyene malonic acid, hydroxy malonic acid, methyl malonic acid, oxo malonic acid and oxy malonic acid.

The various derivatives of succinic acid that may also be employed comprise dihydroxy succinic acid, ethyl succinic acid, hydroxy succinic acid and methyl succinic acid.

Various derivatives of glutaric acid may also be employed including alpha-ethyl glutaric acid, beta-ethyl glutaric acid, methyl-glutaric acid and beta-methyl glutaric acid.

As used throughout the written description and claims, the term "substantially water soluble" will refer to the solubility of the particular component or the overall composition of matter at a concentration and a temperature when in use. Substantial non-toxicity again refers to the concentration of the individual components of the formulation when in use that will not cause substantial harm to plant or animal life and which is in accord with federal regulations for toxicity in this regard. Similarly, the expression "substantially biodegradable" refers to those components in the composition or the overall composition which, under the conditions of use may be biodegraded by conventional microorganisms over a reasonable period of time. Thus, the terms "substantial" or "substantially" as used herein will mean complete or almost complete effectiveness.

The acylglycerol esters that are treated according to the method of the present invention comprise the triacylglycerol, diacylglycerol or monoacyl glycerol esters, where the acyl group will vary in chain length, but for the most part will be based on an unsaturated or saturated fatty acid. The composition of the present invention in a preferred embodiment, however, is formulated to be effective to treat acylglycerol esters that have a melting point in a range from about 10° C. to about 40° C. or preferably at or near room temperature.

The composition of the invention can also be formulated for different applications for treating acylglycerol esters in water so that the lipase enzyme is present in an amount from about 5 to about 20 wt. %, or about 7 to about 18 wt. %, or about 8 to about 15 wt %; the emulsifying agent from about 0 5 to about 20 wt % or about 0.7 to about 18 wt. %, or about 0.8 to about 15 wt. %; the organic acid preservative from about 0.05 to about 0.2 wt. %, or about 0.07 to about 0.18 wt. %, or about 0.8 to about 0.15 the water soluble stabilizer from about 10 to about 40 wt. %, or about 15 to about 30 wt. % or about 18 to about 25 wt. % and the balance water and optionally a fragrance material. The foregoing formulation in use may be diluted with water up to the point where the lipase enzyme activity substantially decreases which is well within the ability of a person having ordinary skill in the pertinent act.

The pH of the above composition is within the range of from about 3.5 to about 4.5 and when diluted to 100 ppm, from about 6.5 to about 6.8. The pH range, therefore, is from about 3.5 to about 6.8 but the composition can be used over a range of from about pH 3.5 to about pH 10.

The following examples are illustrative of the invention. Unless otherwise indicated, all percentages are by weight.

For stability determinations and for comparative evaluations of relative lipase activities, the *Sigma Titrimetic procedure* (Sigma #-800) was employed. Olive oil is the substrate utilized by this procedure. Reactions were carried out at 30° C. for 3 hours.

End points were calculated by titrating with 0.05 N NaOH until a color change was noted (pH indicator: Thymolphthalein) from white to light blue. Sigma-Teitz units/ml and International units/L were calculated.

A Spot Lipolytic Assay was devised employing 35 gms liter deionized water of the bacteriological medium Spirit Blue Agar supplemented with 3% 1,2,3-tributyrlglycerol as a lipid substrate. The substrate was placed in a Petri disk and a 5 mm diameter core about 1 mm deep was hollowed out of the center to produce a well. The composition to be evaluated was then introduced into the well. Zone or halo lipolysis was recorded as a darkening of media from light blue to dark blue at the point of application. Reaction rates were estimated by measuring the zone diameters (mm) over time (1–24 hours at room temperature) and relative activity recorded. Diameter readings were subtracted from the diameter of the agar plug taken out (5 mm). (Activities can be affected by diffusion rates and protein interactions in the medium).

A procedure was devised to Simulate In-Use Performance of the products employing a tub filled with 4 liters of tap water with bubbling air (assists in product distribution) To add insult on the system, 1 milliliter of oil (Olive oil or Suntan oil) were added per 4 liters of water. Daily additions of enzyme were applied (1 oz/1,000 gallons of water) and performance recorded on a grading system: (O, no oil surface sheen observed; 1, 10–30% of sheen remaining; 2, 30–50%, 3, 50–70%; 4, 70–90%; 5, 90–100%. In addition, any other changes to the water quality was recorded (i.e., cloudy or floc observed).

Finally, to determine enzymatic stability of prototypes with pool/spa additives the Sigma titrimetric procedure employing olive oil as substrate was employed. Zone or halo was measured after two hour reaction time. The contact times the enzyme was exposed to the agents were 30 minutes to 1 hour.

The compositions of the present invention were evaluaned with commercially available pool and spa cleaners. The results are reported on Tables 1–4.

TABLE 1

RESULTS AND DISCUSSION
Zone/Halo Spot Lipolytic Assay (mm)
(Spirit Blue Agar: 1,2,3-tributyrylglycerol)

| | Time | | | | | | |
|---|---|---|---|---|---|---|---|
| Product | 0 hr | 1 hr | 2 hr | 4 hr | 8 hr | 24 hr | DZ[1] |
| Dissolve ™ | 0 | 6 | 9 | 14 | 20 | 33 | (9) |
| Spa Scum Gon ™ | 0 | 7 | 9 | 14 | 20 | 37 | (12) |
| Bio-Clear ™ | 0 | 4 | 4 | 3* | 0 | 0 | —** |
| Scum Digester ™/ Pool | 0 | 4 | 8 | 14 | 20 | 37 | (8) |
| Scum Digester ™/ Spa | 0 | 5 | 8 | 14 | 20 | 37 | (8) |
| Nat. Chem/Baquacil | 0 | 5 | 5 | 7* | 7* | 0 | —** |
| Nat. Chem./Pool | 0 | 5 | 5 | 6* | 8* | 0 | —** |
| Nat. Chem./Spa | 0 | 2 | 2* | 5* | 0 | 0 | —** |
| Formula A1 | 0 | 7 | 10 | 15 | 23 | 40 | (10) |
| Formula B1 | 0 | 7 | 10 | 15 | 23 | 41 | (7) |
| Formula C1 | 0 | 6.5 | 10 | 15 | 22 | 38 | (10) |
| Formula D1 | 0 | 7 | 9 | 15 | 21 | 38 | (11) |

TABLE 1-continued

RESULTS AND DISCUSSION
Zone/Halo Spot Lipolytic Assay (mm)
(Spirit Blue Agar: 1,2,3-tributyrylglycerol)

| Product | Time | | | | | | |
|---|---|---|---|---|---|---|---|
| | 0 hr | 1 hr | 2 hr | 4 hr | 8 hr | 24 hr | DZ[1] |
| Formula E1 | 0 | 7 | 10 | 15 | 23 | 39 | (11) |

*Fading of lipolytic activity possibly due to protein inactivation.
Normally 1–2 mm in change in diameter is indicative of 10 fold difference in lipolytic activity. DZ[1] Double zone of clearing around point of application, possibly indicative fatty acyl migration, i.e., the fatty acid esterified at the C-2 position randomly migrates to the C-1 or C-3 position. From there it is quickly cleaved off making the secondary zone observed after prolonged incubation.
No Double Zone Observed
Dissolve Trademark of Applied Biochemist
SPA scum Gon Trademark of Leisure Time
Bio-Clear Trademark of Hydrology labs
Scum Digester Trademark of Robarb
Natural Enzyme Trademark of Natural Chemistry
Natural Chemistry Trademark of Natural Chemistry

TABLE 2

SIGMA DIAGNOSTICS TITRIMETRIC LIPASE ASSAY
(#800)

| Product | (3 hour incubation at 30° C.) | |
|---|---|---|
| | Sigma-Teitz Lipase Units/ml | International Units/L |
| Dissolve ™ | 33.35 | 9.338 |
| Spa Scum Gon ™ | 31.35 | 8.722 |
| Bio-Clear ™ | 0.75 | 210 |
| Break-Up ™ | 2.50 | 700 |
| De-Skum ™ | 2.30 | 644 |
| Skum Digester ™/Pool | 0.95 | 266 |
| Skum Digester ™/Spa | 0.55 | 154 |

TABLE 2-continued

SIGMA DIAGNOSTICS TITRIMETRIC LIPASE ASSAY
(#800)

| Product | (3 hour incubation at 30° C.) | |
|---|---|---|
| | Sigma-Teitz Lipase Units/ml | International Units/L |
| Nat. Enzyme/Baquacil | 1.35 | 378 |
| Nat. Chem./Pool | 1.35 | 378 |
| Nat. Chem./Spa | 0.75 | 210 |
| Formula A1 | 0.55 | 154 |
| Formula B1 | 0.55 | 154 |
| Formula C1 | 39.95 | 11,186 |
| Formula D1 | 36.65 | 10,262 |
| Formula E1 | 1.85 | 518 |

Olive oil (88% Unsat., C:18) is routinely employed as substrate with this assay. pH drop, due to liberation of free fatty acids pH is counteracted with 0.05N NaOH. Indicator used: Thymolphthalein. Approximately less than 10% variability was observed with this assay. Break-up; EZChlor's trade name.
Break-up-Trademark of EZ Chlor

TABLE 3

Compatibility of Formula C1
with Other Pool Additives

Experiment 1: Representative results obtained after serial ten-fold dilutions of formula C1 Spirit Blue Agar: tributyrin substrate

| | Ten-Fold Dilutions | | | | (Zone Diameters in mm) | |
|---|---|---|---|---|---|---|
| Rx. Time | 1 | 1/10 | 1/100 | 1/1,100 | 1,10,000 | 1,100,000 |
| 2 hour | 16 | 15 | 13 | 12 | 9 | halo* |
| 4 hour | 20 | 19 | 18 | 6 | 12 | 7 |
| 6 hour | 24 | 23 | 21 | 19 | 14 | 9 |

*Periphery of plug hole.

TABLE 4

Compatibility of Formula C1 With Several Pool Additives

| Product | Concentration (ppm) | | Formula C1 (dilution) | Spirit Blue Agar Method Zone of lipolysis (mm,[1/] (contact) | | | |
|---|---|---|---|---|---|---|---|
| | | | | 30 min. | 1 hour | | 24 hour[2/] |
| Baquacil | 0 | plus | 1/1,000 | 12 | 12 | | Nd |
| Baquacil | 40 | plus | 1/1,000 | 12 | 12 | | Nd |
| Baquacil | 50 | plus | 1/1,000 | 12 | 12 | | Nd |
| Baquacil | 60 | plus | 1/1,000 | 12 | 12 | | Nd |
| Baquacil | 80 | plus | 1/1,000 | 12 | 12 | | Nd |
| Softswim B | 0 | plus | 1/1,000 | Nd | 10 | | 34 |
| Softswim B | 40 | plus | 1/1,000 | Nd | 10 | | 31 |
| Softswim B | 50 | plus | 1/1,000 | Nd | 10 | | 32 |
| Softswim B | 60 | plus | 1/1,000 | Nd | 10 | | 32 |
| Softswim B | 80 | plus | 1/1,000 | Nd | 10 | | 33 |
| WSCP | 1 | plus | 1/1,000 | 10 | 11 | | Nd |
| WSCP | 2 | plus | 1/1,000 | 10 | 11 | | Nd |
| WSCP | 4 | plus | 1/1,000 | 10 | 11 | | Nd |
| WSCP | 5 | plus | 1/1,000 | 10 | 11 | | Nd |
| Chlorine | 0 | plus | 1/1,000 | 12 (20) | 12 (20) | | Nd |
| Chlorine | 2 | plus | 1/1,000 | 11 (19) | 11 (15) | | Nd |
| Chlorine | 4 | plus | 1/1,000 | 0 (12) | 0 (9) | | Nd |
| Chlorine | 8 | plus | 1/1,000 | 0 (10) | 0 (0) | | Nd |
| Chlorine | 10 | plus | 1/1,000 | 0 (6) | 0 (0) | | Nd |
| | | | | 30 min. | 2 hr. | 6 hr. | 24 hr. |
| BCDMH | 0 | plus | 1/1,000 | (45) | (45) | (45) | (45) |
| BCDMH | 1 | plus | 1/1,000 | (40) | (43) | (40) | (41) |
| BCDMH | 2 | plus | 1/1,000 | (35) | (35) | (36) | (41) |
| BCDMH | 4 | plus | 1/1,000 | (10) | (10) | (9) | (8) |
| BCDMH | 8 | plus | 1/1,000 | (0) | (0) | (0) | (0) |

TABLE 4-continued

| Compatibility of Formula C1 With Several Pool Additives | | | |
|---|---|---|---|
| Product | Concentration (ppm) | Formula C1 (dilution) | Spirit Blue Agar Method Zone of lipolysis (mm,[1/] (contact) |

Nd, not determined.
Chlorine source: Calcium hypochlorite.
Baquacil, Trademark of Zeneca, a biguanide
Softswim B, Trademark of Biolab Inc., a biguanide
WSCP, Trademark of Buckman Inc., a polymeric quaternary ammonium compound
BCDMH (1-bromo-3-chloro 5,5-dimethyl hydantoin)
[1/]Zone of lipolysis 2 hours after contact with product is terminated; numbers in parenthesis, 24 hours after contact is terminated.
[2/]Time of contact before product is neutralized.

TABLE 5

In-Use Simulation-Performance Assay Employing Olive Oil as Substrate (Tub Assay)

| Product | Day 1 | Day 2 | Day 3 |
|---|---|---|---|
| Dissolve ™ | 3/Floc | 0/Floc | 0/Floc |
| Spa Scum Gon ™ | 5 | 4/Floc | 0/Floc |
| Bio-Clear ™ | 5 | 4 | 3 |
| Scum Digester ™/Pool | Nd | Nd | Nd |
| Scum Digester ™/Spa | 3/Floc | 3/Floc | 0/Floc |
| Nat. Enzyme/Baquacil | 4 | 4/Cloudy | 4/Cloudy |
| Nat. Chem./Pool | 5 | 5 | 5 |
| Nat. Chem./Spa | 4 | 4 | 3/Cloudy |
| Formula A1 | 3/Cloudy | 0/Cloudy | 0/Cloudy |
| Formula B1 | 3/Cloudy | 0/Cloudy | 0/Cloudy |
| Formula C1 | 0/Floc | 0/Floc | 0/Floc |
| Formula D1 | 0/Floc | 0/Floc | 0/Floc |
| Formula E1 | Nd | Nd | Nd |
| Control | 5 | 5 | 5 |

On day 0 all tubs had a reading of 5. Dose for all enzyme formulations 1,000 gallons (recommended dose). Nd, not determined.
Cloudy: water turned hazy or turbid
Floc: aggregated floating substrate Composition A1

| | | |
|---|---|---|
| Emulsifying Agent | Neodol 25-9[1] | 10% |
| Stabilizer | Glycerol | 20% |
| Lipase | Greasex 100-L | 10% |
| | Fragrance (lemon-lime) | 0.1% |
| | Water | 59.9% |

Composition B1

| | |
|---|---|
| Neodol 25-9[1] | 10% |
| Glycerol | 20% |
| Greasex 100-L | 10% |
| Polyvinylpyrrolidone | 2% |
| Fragrance (lemon-lime) | 0.1% |
| Water | 57.9% |

[1]$C_{12}$—$C_{15}$ alcohol ethoxylate of ethylene oxide (EO); molecular weight 610; hydroxyl number 92; average moles of EO, 9; EO wt. %, 67; HLB, 13.3; cloud point, 74° C.; pour point, 24° C.; flash point, 188° C.; specific gravity, 0.982.

Composition C1

| Ingredients: | |
|---|---|
| Water | 68.8 |
| Scorbic Acid | 0.1% |
| Glycerol | 20.0% |
| Neodol 25-7[1] | 1.0% |
| Greasex L-100 | 10.0% |

-continued

| | |
|---|---|
| Lemon-Lime Fragrance | 0.1% |
| Flash Point | None below 22° F. |
| pH | 3.8 to 4.1 |
| pH 100 ppm | 6.72 |
| Density | 1.055 |

Composition C1 Physical and Chemical Properties

| FORMULA C1: | |
|---|---|
| pH: | 3.81 |
| pH (100 ppm): | 6.72 |
| Density: | 1.055 |
| Flash point: | none below 220° F. |
| Viscosity: | 10 cps |
| Appearance: | Slight hazy white |
| Odor: | Lemon |
| Solubility: | very water soluble |
| Optimum range of activity: | |
| pH range: | 6–10 |
| Temperature range: | 30–40 C. |

Composition D1

| | |
|---|---|
| Neodol 25-7[1] | 5.0% |
| Glycerol | 7.5% |
| Greasex 100-L | 7.0% |
| Polyvinylpyrrolidone | 2.0% |
| Fragrance (lemon-lime) | 0.1% |
| Water | 78.4% |

[1]$C_{12}$—$C_{15}$ alcohol ethoxylate of ethylene oxide (EO); molecular weight 619; hydroxyl number 108; average moles of EO, 7.2; EO wt. %, 61, HLB, 12.2; cloud point, 50° C.; pour point, 21° C.; flash point 177° C.; specific gravity, 0.967.

Composition E1

| | |
|---|---|
| Neodol 91-6[1] | 5.0% |
| Glycerol | 10.0% |
| Greasex 100-L | 10.0% |
| Lemon-lime | 0.1% |
| Water | 74.9% |

[1]$C_9$–$C_{11}$ alcohol ethoxylate of ethylene oxide (EO); molecular weight 425; hydroxyl number 132; average moles of EO, 6; EO wt. %, 62; HLB, 12.5; cloud point, 52° C.; pour point, 7° C.; flash point, 168° C.; specific gravity, 0.991.

Thus, in one embodiment, the lipase comprises from about 5 to about 20 weight percent of a lipase enzyme;

the non-ionic emulsifying agent is present in an amount from about 0.5 to about 20 weight percent and comprises a substantially linear $C_{12}$–$C_{15}$ or $C_9$–$C_{11}$ alcohol ethoxylate having about 6 to about 9.0 mols on average of ethylene oxide in the condensate, a molecular weight determined from OH number of about 425 to about 610; a hydroxyl number of from about 62 to about 132; an HLB of from about 12.2 to about 13.3, a cloud point of from about 50° C. to about 74° C., a pour point from about 7° C. to about 24° C., a flash point of from about 168° C. to about 188° C. and a specific gravity of from about 0.967 to about 0.991;

the water soluble organic acid preservative is present in an amount from 0 to 0.2 weight percent, and the water soluble stabilizer is present in an amount from about 10 to about 40 weight percent.

Preferably, the non-ionic emulsifying agent is a substantially linear $C_{12}$–$C_{15}$ alcohol ethoxylate having a molecular weight of about 619, a hydroxyl number of about 108 about 7.2 mols on average of ethylene oxide in the condensate, an HLB balance of about 12.2, a cloud point of about 50° C. a pour point of about 21° C., a flash point of about 177° C. and a specific gravity of about 0.967.

In another preferred embodiment, the water soluble organic acid preservative is sorbic acid and the water soluble stabilizer is glycorol.

Based on the data obtained by the pH-Stat method all prototypes developed A1–E1, including Leisure Time's Spa Scum Gon product had the fastest rates of hydrolysis, followed by Robarbs Scum Digester/Pool and Scum Digester/Spa. Natural chemistry's Nat. Enzyme/Baquacil, Nat Enzyme/Pool and Nat. Enzyme Spa showed no activity (hydrolysis) with this method, possibly indicative of low active ingredient or instability of the formulated lipase.

The Sigma Titrimetric Assays demonstrated Formulas C1 and D1 to have the highest level of activity versus all other tested formulas. The second highest level of activity was observed for Applied Biochemist's Dissolve™ followed by Leisure Time's Spa Scum Gon™ products. All other prototypes including Natural Chemistry's had low activity in this assay.

The Spirit Blue Agar lipolytic assays demonstrated that the compositions of the present invention had the highest values and fastest rates of hydrolysis, followed by Robarb's, Leisure time's and Applied Biochemist products. Natural chemistry's products and Hydrology Laboratories Bio Clear, showed decreased activity over time in this assay. Such loss could be attributed to protein inactivation of lipolytic activity. Other enzymatic assays were run with these formulations if by any chance other enzyme types were employed, (i.e., proteases, phospholipases). Some weak phospholipase activity was observed (data not shown) among these products.

Finally, the In-Use simulation studies showed several interactions with different formulas. Formulas C1 and D1 totally hydrolyzed the triglyceride and made a surface floc of free fatty acids. Robarb's, Leisure Time's and Applied Biochemist formulas had similar but slower Floc appearance. All Natural Chemistry's products and Hydrology Laboratories showed no floc; instead the water turned very cloudy. Formulas A1 and B1 had similar results but effectively removed surface sheen by day 2.

It is evident from the material presented that the compositions of the present invention offer an effective, non-toxic, biodegradable stable formulation that removes oil deposits commonly encountered in pools, spas and hot tubs. The compositions have a broad range of lipolytic activity upon both short and long chain triglycerides; saturated oils such as coconut oil, lard and cocoa butter and unsaturated oils, such as olive, jojoba and sesame seed oils, qualities not observed among other commercial products.

It will be apparent to those skilled in the art that modifications and variations can be made in the composition and method of the present invention without departing from the spirit or scope thereof. It is intended that these modifications and variations and their equivalents are to be included as part of this invention provided they come within the scope of the appended claims.

What is claimed is:

1. A method for treating water containing acylglycerol esters comprising contacting said water with a enzyme composition of matter comprising a mixture of compounds for reducing the amount of acylglycerol esters in water which include:

(a) a lipase enzyme;

(b) a nonionic emulsifying agent comprising an alcohol ethoxylate emulsifying agent;

(c) a water soluble organic acid preservative comprising an unsaturated organic acid having from 2 to about 10 carbon atoms and from 1 to about 2 carboxyl groups, and (d) a water soluble stabilizer comprising a polyol or a mixture of polyols having 2 to about 6 carbon atoms and 2 to about 6 hydroxyl groups.

2. The method of claim 1, wherein said composition has a pH of from about 3.5 to about 6.8.

3. The method of claim 1, wherein said lipase enzyme is optionally combined with a second enzyme, wherein said second enzyme is a phospholipase, protease, amylase, cellulase, pectinase, beta-glucanase, isomerase or a redox enzyme.

4. The method of claim 3, where said water soluble organic acid preservative is an unsaturated carboxylic acid having up to about 6 carbon atoms.

5. A method for treating water containing acylglycerol esters comprising contacting said water with an enzyme composition of matter comprising a mixture of compounds for reducing the amount of acylglycerol esters in water which include:

(a) an enzyme comprising a lipase enzyme;

(b) a non-ionic emulsifying agent comprising an alcohol ethoxylate emulsifying agent;

(c) a water soluble organic acid preservative comprising sorbic acid and;

(d) a water soluble stabilizer comprising glycerol.

6. The method of claim 1 where:

said (a) lipase enzyme comprises lipase and is present in an amount of from about 5 to about 20 weight percent;

said (b) non-ionic emulsifying agent is present in an amount from about 0.5 to about 20 weight percent;

said (c) water soluble organic acid preservative is present in an amount from up to about 0.2 weight percent;

said (d) water soluble stabilizer is present in an amount from about 10 to about 40 weight percent and;

the balance comprising water.

7. The method of claim 1 where:

said (a) lipase enzyme;

said (b) non-ionic emulsifying agent;

said (c) water soluble organic acid preservative and said (d) water soluble stabilizer are substantially biodegradable and substantially non-toxic.

8. The method as in one of claims 1, 2, 3–7 where said emulsifying agent is an alcohol ethoxylate condensation product of a substantially linear alcohol having from about 9 to about 15 carbons and ethylene oxide so that said ethylene oxide is present as a polyoxyethylene group in an amount greater than about 50 mol % of said alcohol ethoxylate, said alcohol ethoxylate having an HLB of from about 8 to about 18.

9. The method of claim 7 where;

said (b) non-ionic emulsifying agent is present in an amount from about 0.5 to about to 20 weight percent and comprises a substantially linear $C_{12}$–$C_{15}$ or $C_9$–$C_{11}$ alcohol ethoxylate having about 6 to about 9.0 mols on average of ethylene oxide in the condensate, a molecular weight from about 425 to about 610, a hydroxyl number from about 92 to about 132, an HLB of from about 12.2 to about 13.3, a cloud point of from about 50° C. to about 74° C., a pour point from about 7° C. to about 24° C., a flash point of from about 168° C. to about 188° C. and a specific gravity of from about 0.967 to about 0.991.

10. The method of claim 9 where said (b) non-ionic emulsifying agent is a substantially linear $C_{12}$–$C_{15}$ alcohol ethoxylate having about 7.2 mols on average of ethylene oxide in the condensate, a molecular weight of about 619, a hydroxyl number of about 108, an HLB balance of about 12.2, a cloud point of about 50° C., a pour point of about 21° C., a flash point of about 177° C. and a specific gravity of about 0.967.

11. The method of claim 10 wherein said composition comprises a mixture of compounds for reducing the amount of acylglycerol esters in water which include:

(a) an enzyme comprising a lipase enzyme;

(b) a non-ionic emulsifying agent which is a substantially linear C12 –C15 alcohol ethoxylate having about 7.2 moles on average of ethylene oxide in the condensate, a molecular weight of about 619, a hydroxyl number of about 108, an HLB balance of about 12.2, a cloud point of about 50° C., a pour point of about 21° C., a flash point of about 177° C. and a specific gravity of about 0.967;

(c) sorbic acid as a water soluble organic acid preservative and;

(d) glycerol as a water soluble stabilizer.

12. The method of any one of claims 1, 2, 3–7 wherein said nonionic emulsifying agent comprises an alkylene oxide condensation products that provides coupling oil to water and has the formula:

$$RX(CH_2CH_2O)_nH$$

where the molecular weight of the emulsifying agent is in a range so that the emulsifying agent is soluble in water at temperatures from about 10° C. and higher;

wherein R is an oleophilic group comprising:

(a) a linear alcoholate of sufficient molecular weight so that it is oleophilic and optionally contains some alkyl branching;

(b) an alkyl phenol; or (c) a polyether wherein said polyether is a polyoxypropylene group or a block or heteric mixture of polyoxypropylene and polyoxyethylene groups;

X may be either oxygen, nitrogen or sulfur;

n is the average number of oxyethylene units in the hydrophilic group and is greater than about 5 to impart water solubility to said emulsifying agent;

the hydrophilic group $-(CH_2CH_2O)_n-$ comprises greater than about 50 mol percent of the emulsifying agent, and optionally comprises a heteric or block mixture of repeating oxyethylene groups and oxypropylene groups.

* * * * *